United States Patent
White et al.

(10) Patent No.: US 12,187,408 B2
(45) Date of Patent: Jan. 7, 2025

(54) DOOR ASSEMBLY

(71) Applicant: BAE SYSTEMS PLC, London (GB)

(72) Inventors: Andrew Charles White, Preston (GB); Andrew Ridley, Preston (GB)

(73) Assignee: BAE SYSTEMS PLC, London (GB)

( * ) Notice: Subject to any disclaimer, the term of this patent is extended or adjusted under 35 U.S.C. 154(b) by 60 days.

(21) Appl. No.: 17/919,578

(22) PCT Filed: Apr. 20, 2021

(86) PCT No.: PCT/GB2021/050942
§ 371 (c)(1),
(2) Date: Oct. 18, 2022

(87) PCT Pub. No.: WO2021/214445
PCT Pub. Date: Oct. 28, 2021

(65) Prior Publication Data
US 2023/0150645 A1    May 18, 2023

(30) Foreign Application Priority Data

Apr. 23, 2020  (EP) .................................... 20275077
Apr. 23, 2020  (GB) .................................... 2005942

(51) Int. Cl.
*B64C 1/14*  (2006.01)
*B64C 1/38*  (2006.01)
*B64D 1/06*  (2006.01)

(52) U.S. Cl.
CPC .............. *B64C 1/1415* (2013.01); *B64D 1/06* (2013.01); *B64C 1/38* (2013.01)

(58) Field of Classification Search
CPC ................................ B64C 1/1415; B64D 1/06
See application file for complete search history.

(56) References Cited

U.S. PATENT DOCUMENTS 3,613,498 A   10/1971  Riccius et al.
4,637,292 A   1/1987   Peterson
(Continued)

FOREIGN PATENT DOCUMENTS

CN   103895853 A   10/2015
EP   1129939 A2    9/2001
(Continued)

OTHER PUBLICATIONS

International Search Report dated Jul. 26, 2021 issued in PCT/GB2021/050942.
(Continued)

*Primary Examiner* — Richard Green
*Assistant Examiner* — Ashesh Dangol
(74) *Attorney, Agent, or Firm* — Scully, Scott, Murphy & Presser, P.C.

(57) ABSTRACT

A door assembly for a payload bay (10) having an opening (12), the door assembly comprising at least one door (20, 220). The at least one door comprises: a panel section (22, 222) having a first end (24, 224) and a second end (26, 226); and a first mounting member (30, 230) arranged orthogonally to the panel section at the first end and having a first engagement feature (31, 231) having a rotational axis (18, 218) about which the panel section is arranged to rotate. The engagement feature is arranged to engage with a first fixing member (16, 216) on one side of the payload bay to rotatably couple the panel section to the payload bay. The at least one door is arranged to translate between a closed configuration, in which the panel section is arranged in the same plane as the opening, and an open configuration, in which the panel section is arranged at at least 90 degrees to the plane of the opening, by rotating about the rotational axis. The panel section is arranged parallel to and offset from the rotational (Continued)

axis, such that an inner surface of the panel section faces the rotational axis.

15 Claims, 9 Drawing Sheets

(56) References Cited

U.S. PATENT DOCUMENTS

| | | |
|---|---|---|
| 6,536,711 B1 | 3/2003 | Conway, Jr. et al. |
| 2010/0140406 A1 | 6/2010 | Walton et al. |
| 2013/0221158 A1* | 8/2013 | Binkholder .............. F41F 3/065 89/1.51 |
| 2019/0210738 A1* | 7/2019 | Arany-Kovacs ...... B64C 1/1407 |

FOREIGN PATENT DOCUMENTS

| | | |
|---|---|---|
| EP | 2088078 A2 | 8/2009 |
| GB | 537234 A | 6/1941 |
| GB | 2578743 A | 5/2020 |
| WO | 2015043568 A1 | 4/2015 |

OTHER PUBLICATIONS

GB Search Report dated Sep. 30, 2020 issued in GB 2005942.4.
Extended European Search Report dated Oct. 16, 2020 issued in EP 20275077.4.

* cited by examiner

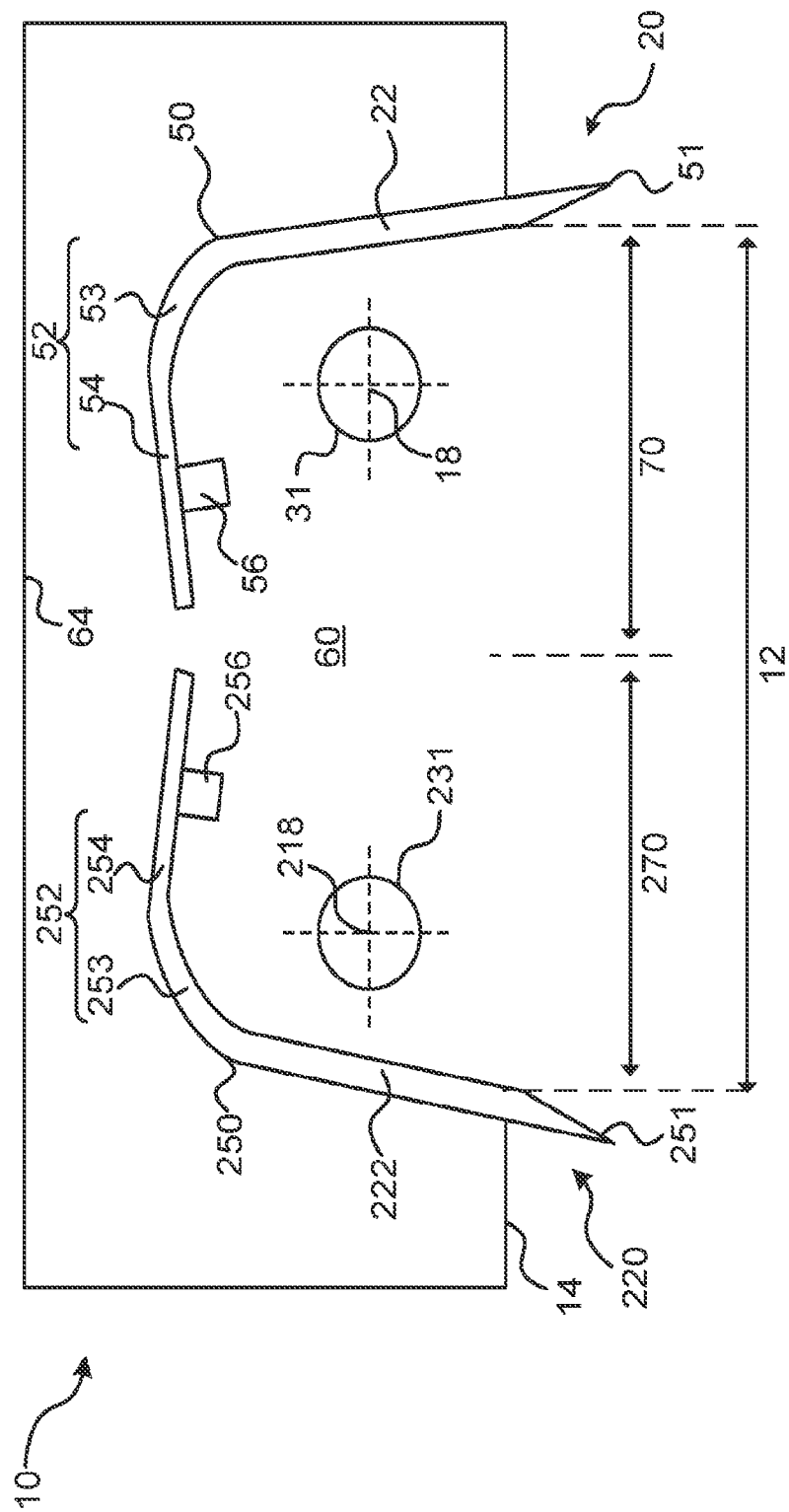

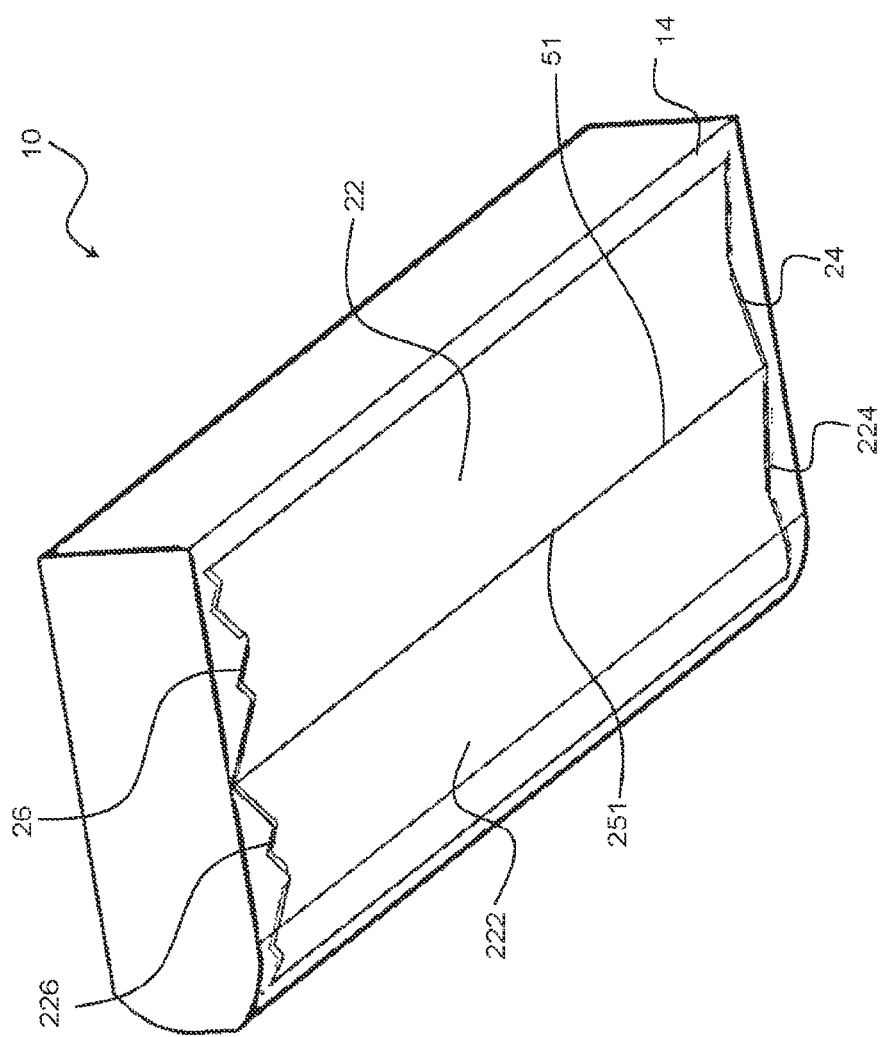

DOOR ASSEMBLY

The present disclosure relates to a door assembly. In particular, the disclosure relates to a door assembly for a payload bay.

BACKGROUND

Hinge-mounted doors are well known. Hinges, normally located on an edge of the door, provide an articulated join between the door and the structure to which the door is attached. Any force generated by the weight of the door, or imparted to the door, is transmitted to the structure via the hinge.

If it is required for the door to be automated, then an actuator must be coupled to the door in some way. This may be via a lever mechanism, which acts on the door. Alternatively, the hinges may be at the edge of the door arms, which swing the door from a closed to an open position. Since doors often need to be opened fully to allow maximum access through an opening they cover, mechanisms of the prior art must be able to open the door to at least ninety degrees from a closed position. Such an example, U.S. Pat. No. 6,536,711B1 (Lockheed Martin), is illustrated in FIG. 1. Here, an internal payload bay 1010 for an aircraft includes a pair of doors 4a, 4b. The bay 1010 may contain a payload 1062. The doors 4a, 4b are arranged to open outwardly away from the aircraft. Each door 4a, 4b is connected by at least one hinge 3a, 3b to a structural member 1014 of the aircraft, such as the fuselage.

However, such a door assembly is complicated and, because the hinge 3a, 3b is attached to one edge of the door 4a, 4b, several hinges 3a, 3b may be required to support the weight of the door 4a, 4b and any other forces imparted to the door 4a, 4b. Hence deformation or fatigue of the hinge 3a, 3b may occur.

On applications such as aircraft, the extent to which the door 4a, 4b opens may cause further problems, for example when the aircraft is on the ground. In the example illustrated in FIG. 1, the payload bay 1010 is arranged on the underside of an aircraft such that doors 4a, 4b open downwards. When a door 4a, 4b is fully open, the extent to which the free edge of the door 4a, 4b extends away from the airframe reduces ground clearance and provides an obstruction to access to the cavity within the payload bay 1010.

The doors 4a, 4b also act to increase wind resistance when the aircraft is in flight, which reduces fuel efficiency and increases actuation loads.

Large exposed doors 4a, 4b can have a negative impact on aircraft lateral stability, often requiring the aircraft's vertical fin area to be increased or other mechanisms to compensate, resulting in additional weight.

Hence a door assembly, which is operable to open and close but reduces the extent to which the door extends away from the structure to which it is attached, is highly desirable.

SUMMARY

According to a first aspect, there is provided a door assembly for a payload bay having an opening, the door assembly comprising at least one door, the at least one door comprising:
  a panel section having a first end and a second end; and
  a first mounting member arranged orthogonally to the panel section at the first end and having a first engagement feature having a rotational axis about which the panel section is arranged to rotate, the engagement feature being arranged to engage with a first fixing member on one side of the payload bay to rotatably couple the panel section to the payload bay,
  wherein the at least one door is arranged to translate between a closed configuration, in which the panel section is arranged in the same plane as the opening, and an open configuration, in which the panel section is arranged at at least 90 degrees to the plane of the opening, by rotating about the rotational axis, and
  wherein the panel section is arranged parallel to and offset from the rotational axis, such that an inner surface of the panel section faces the rotational axis.

The door assembly may comprise a second mounting member disposed opposite the first mounting member, the second mounting member comprising a second engagement feature arranged co-axially with the rotational axis. The second mounting member may be arranged to engage with a second fixing member on the opposite side the payload bay, and the first engagement feature and second engagement feature may be arranged to permit the panel section to rotate about the rotational axis.

The panel section may comprise a free edge extending between the first end of the panel section and the second end of the panel section and a fixing edge parallel to and opposite the free edge, the door comprising a reinforcement member extending from the fixing edge.

The extent of the reinforcement member in the horizontal plane may be less than the extent of the panel section in the vertical plane when the door is in the open configuration. In other words, the panel section may be deeper than the reinforcement member.

The reinforcement member may comprise mounting means for coupling a payload to the at least one door. The mounting means may be at least one of a recess or pylon. In other words, the door assembly may be a payload carriage.

The reinforcement member may comprise a planar portion arranged at about 90 degrees to the panel section. The reinforcement member may comprise an arcuate portion having one edge coupled to the fixing edge. The planar portion may comprise the payload mounting means.

The, or each, mounting member may be coupled to the panel section and/or the reinforcement member.

The first engagement feature may comprise an aperture for receiving the first fixing member. Alternatively, the first engagement feature may comprise a protrusion for fitting into an aperture of the first fixing member. The first engagement feature and first fixing member may be arranged to engage with each other by a friction fitting or interlocking teeth. Alternatively, the first engagement feature may be arranged to freely rotate relative to the first fixing member.

The door assembly may comprise the first fixing member and a first actuator for driving the first fixing member to rotate the first engagement feature, such that the panel section is rotatable with, and driveable by, the first rotatable fixing member about the rotational axis.

The door assembly may comprise the second fixing member and a second actuator for driving the second fixing member to rotate the second engagement feature, such that the panel section is rotatable with, and driveable by, the second rotatable fixing member about the rotational axis.

The door assembly may comprise a first door and a second door, arranged such that, when both the first door and second door are in the closed configuration:
  the free edges of each panel section face each other; and
  the first door and second door cover substantially the whole of the opening.

According to a second aspect of the present invention, there is provided a payload bay comprising a support structure and a door assembly according to the first aspect, wherein the support structure defines an opening providing access to/from a cavity within the payload bay. The mounting member of the at least one door is located inside the cavity such that the rotational axis is offset from the plane of the opening. The support structure, specifically a ceiling thereof, may comprise one or more payload mounting means.

In the open configuration, the panel section of the at least one door may only partly extend out of the cavity, the remainder of the at least one door being located in the cavity.

According to a third aspect of the present invention, there is provided an aircraft comprising a payload bay according to the second aspect, the payload bay being arranged such that the outer surface of the panel section forms part of an outer surface of the aircraft when the at least one door is in the closed configuration.

Hence, there may be provided a door assembly, a payload bay comprising a door assembly of the present disclosure, and an aircraft comprising a payload bay of the present disclosure. The door assembly provides a more space-efficient door assembly compared to examples of the related art, and reduces the surface area of door extended into the airflow when the door is open. It also provides a means of mounting an automated door with a more robust mounting mechanism than that provided by the related art.

BRIEF DESCRIPTION OF THE DRAWINGS

Examples of the present disclosure will now be described with reference to the accompanying drawings, in which:

FIGS. 3a and 3b show cross-section views of a payload bay of the present disclosure having a door assembly in respectively an open configuration and a closed configuration;

FIGS. 4a to 4e show a perspective view of the opening sequence of the door assembly of the payload bay shown in FIGS. 3a and 3b;

DETAILED DESCRIPTION

Generally, the present disclosure relates to a door assembly for use in covering and uncovering a cavity, recess, compartment or the like, preferably in an aircraft. The door assembly includes one or more doors, along with associated actuation means. One or more payloads may be stored on the inside surface of the door. The door assembly may be used to cover and provide access to mechanisms in a payload bay for maintenance reasons, or the like, or so that a payload can be deployed. The doors are arranged to open and close by rotating about an axis of rotation offset from a panel section of each door, such that when the door is open very little of the panel section extends outside of the payload bay, and when the door is closed the panel section is co-planar with an outer surface of the vehicle or structure in which it is installed. When incorporated into an aircraft, the door therefore becomes part of the aircraft's outer skin when closed.

Figure 2:
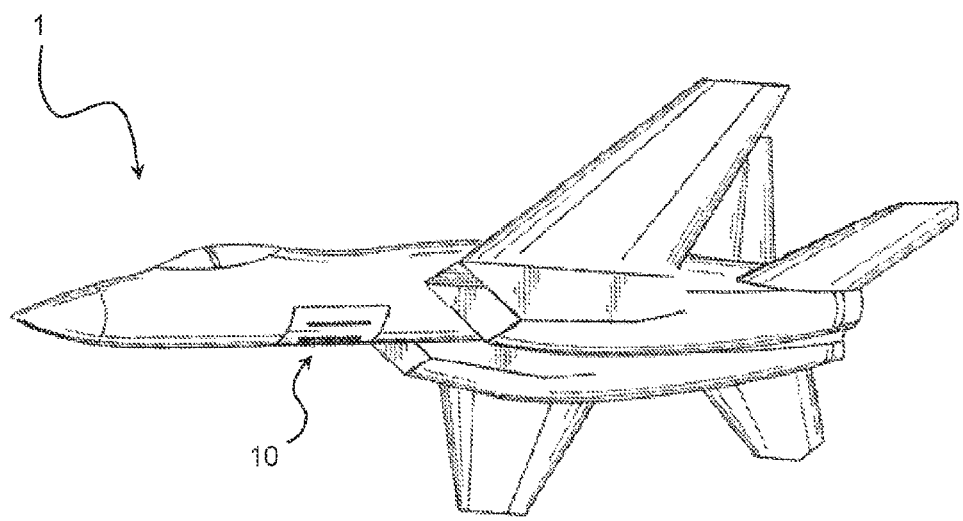
FIG. 2 shows a perspective view of an aircraft having a payload bay according to the present disclosure.

An aircraft 1 having a payload bay 10 is illustrated in FIG. 2. The payload bay 10 may instead be provided as part of a land or sea-going vehicle, or a different type of air vehicle. The payload bay 10 may also be provided as part of a static building or structure. For example, the payload bay 10 could be used to house a lifeboat for a ship internally, landing gear in an aircraft, or cargo in a spacecraft. The payload bay 10, described in more detail with relation to FIGS. 3a to 6c, comprises at least one door 20, 220 which is operable to open and close. The payload bay 10 of the present disclosure has particular efficacy when incorporated as part of an aircraft 1, as here minimising air resistance when deploying payloads is highly desirable. The aircraft 1 may be a transport aircraft, fighter jet, commercial airliner, helicopter or airship, for example. The payload bay 10 in the illustrated embodiment is installed in a ventral part of the fuselage of the aircraft 1. However, the payload bay 10 may alternatively be installed in a side or dorsal part of the fuselage. The payload bay 10 may also be installed in the wings of the aircraft 1, or may define an external pod for coupling to the aircraft 1. The aircraft 1 may be provided with more than one payload bay 10, depending on mission requirements.

The payload bay 10 illustrated in FIG. 2, and throughout the present disclosure, comprises two doors, disposed opposite each other such that the payload bay 10 is only fully open when both doors are in their fully open configuration. However, it would be appreciated by the skilled person that one single door may be used to fully close or open the opening, depending on the payload bay's depth and width. Each or the door may also be divided along its length to provide a plurality of doors along the longitudinal axis of the payload bay 10. When a door of the payload bay 10 is closed, that outer surface of the closed door forms part of the outer skin of the aircraft 1.

Figure 3B:
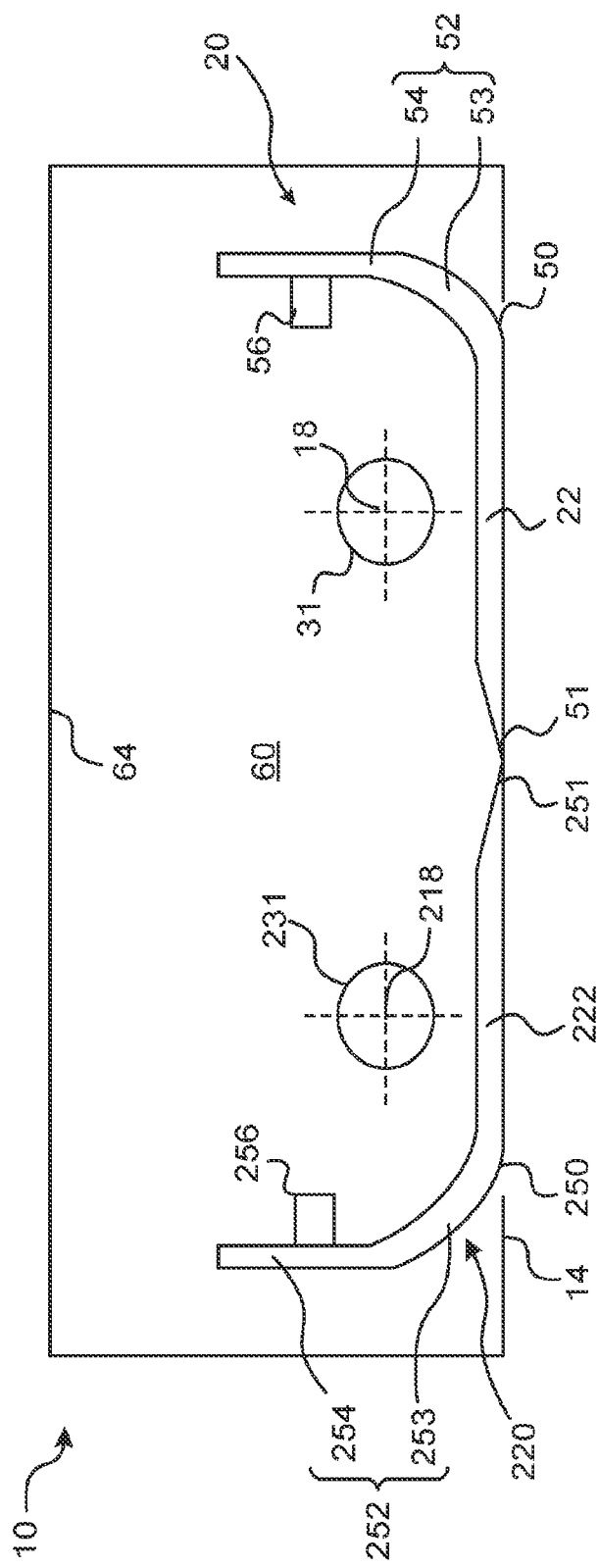
Figure 5:
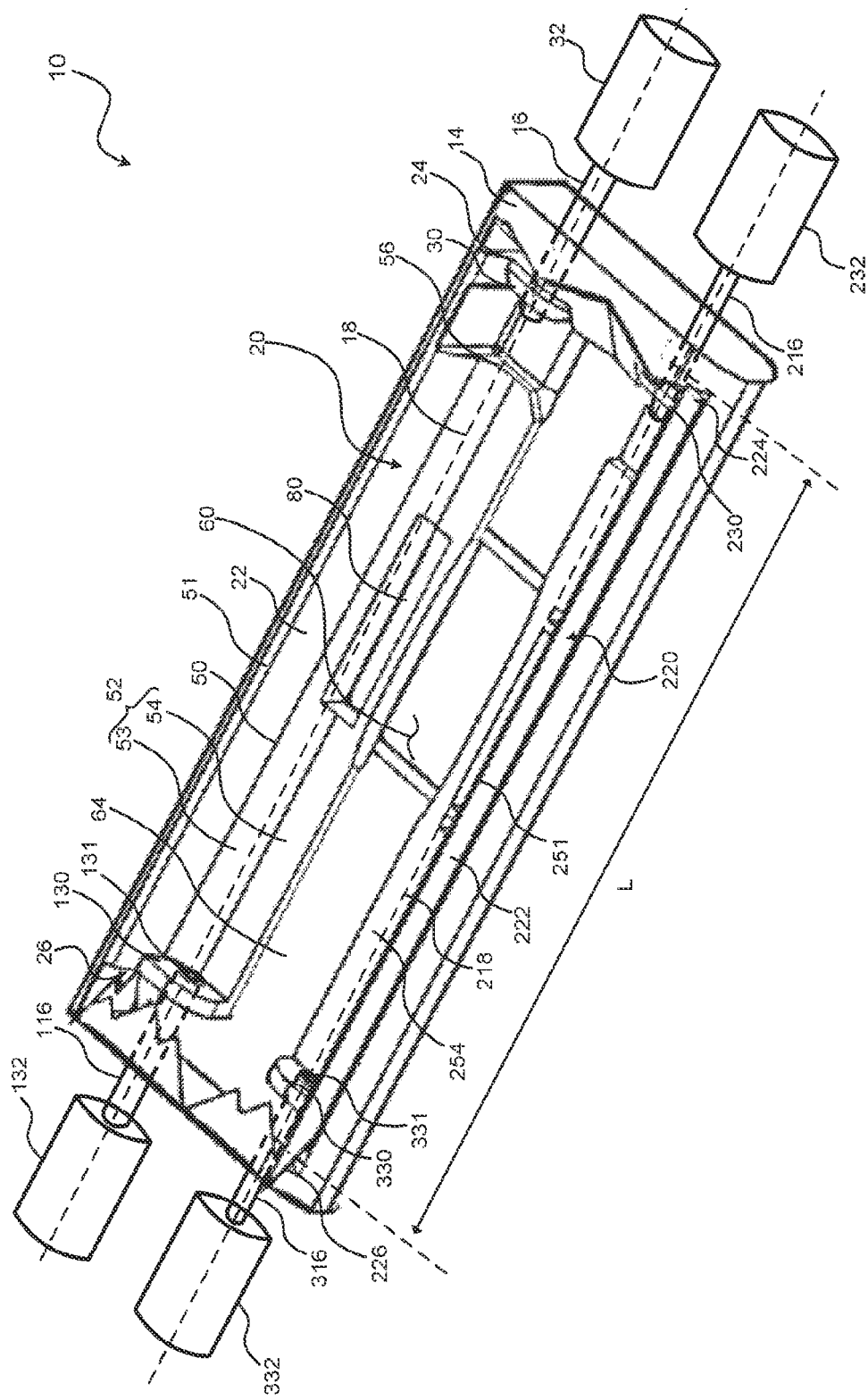
FIG. 5 shows a perspective view of the payload bay having the door assembly in the open configuration.
Figure 6A:
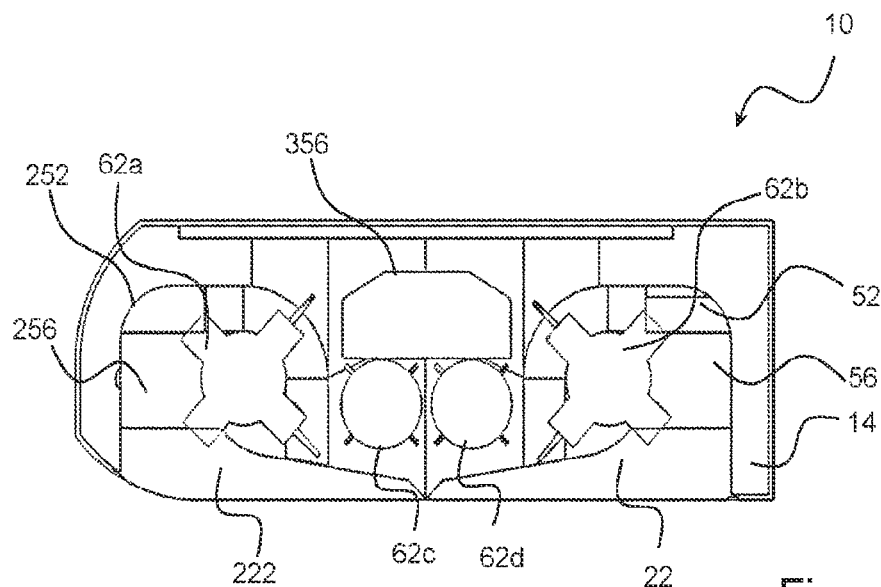
FIGS. 6a and 6b show cross-section views of a payload bay of the present disclosure having a door assembly in respectively the closed configuration and the open configuration.
Figure 6B:
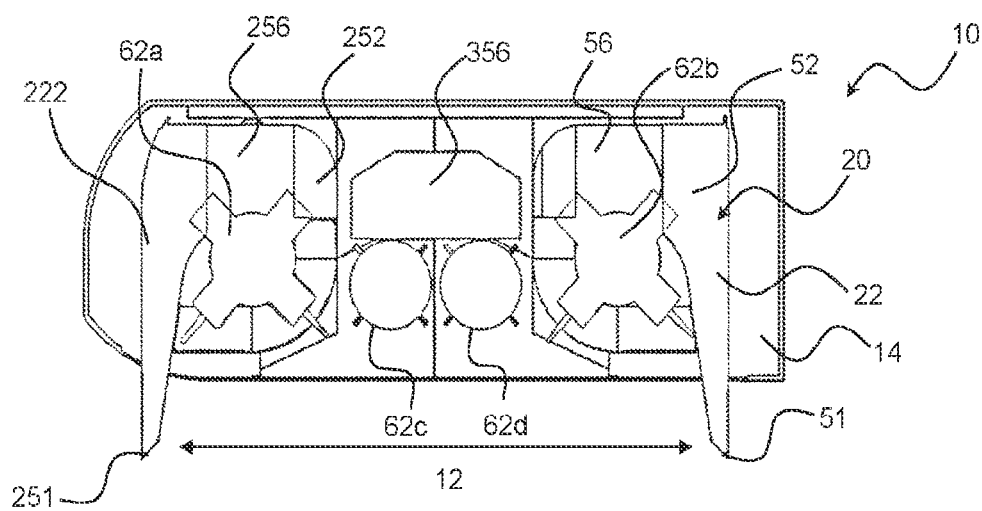
Figure 6C:
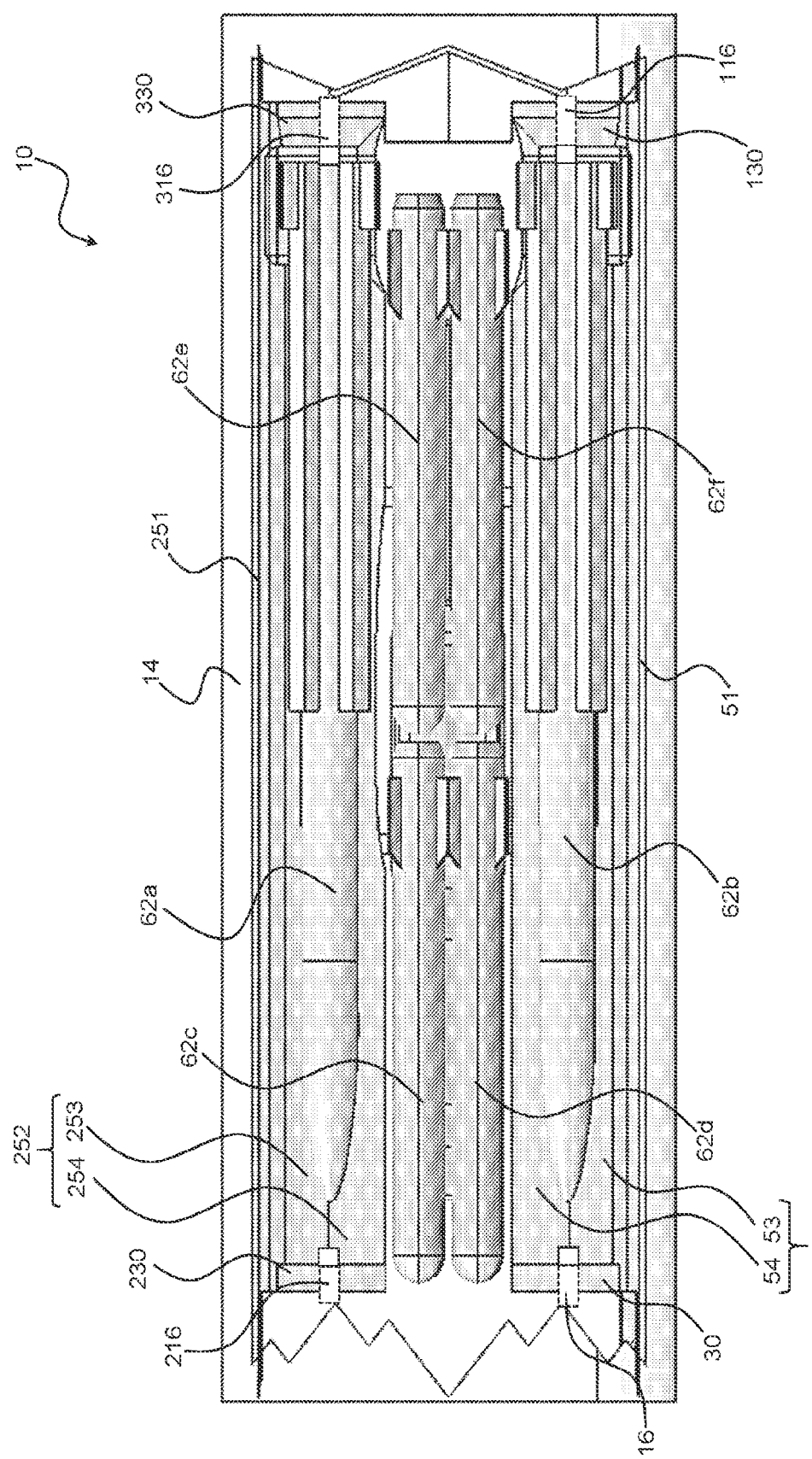
FIG. 6c shows a plan view the payload bay illustrated in FIG. 6b.

The payload bay 10, specifically a door assembly installed therein, will now be described with reference to FIGS. 3a to 6c. In the example of FIGS. 3a to 5, the payload bay 10 is shown empty. FIGS. 3a and 3b show a payload bay having a slightly different door shape than that of FIGS. 4a to 5, although its method of operation is the same. FIGS. 6a to 6c show a similar example of the payload bay 10 illustrated in FIGS. 4a to 5, but here the payload bay 10 is provided with example payloads 62. Given the similarities of all of the examples, the same reference numerals have been used to reference like features.

Turning to FIGS. 3a and 3b, a payload bay 10 is illustrated in cross section. The payload bay 10 comprises a first door 20 and second door 220. In FIG. 3a, the doors 20, 220 of the payload bay 10 are shown in an open configuration (in this example, the fully open configuration, or fully open state). In FIG. 3b, the doors 20, 220 of the payload bay 10 are shown in a closed configuration (or closed state). As illustrated in FIGS. 4b to 4e, the doors 20, 220 translate (or transition) through partially open configurations between the closed configuration and fully open configuration. In partially open configurations, the opening 12 (or relevant region 70, 270 thereof) is not open to its full extent.

The payload bay 10 comprises a support structure 14 having an opening 12 through which its internal cavity 60 can be accessed. In the examples shown, the opening 12 is substantially rectangular; however, it would be appreciated that the opening 12 could be circular, for example, and the doors 20, 220 shaped accordingly. The support structure 14 is substantially cuboid in form. The payload bay 10 as illustrated is self-contained such that it can be retrofitted into or onto existing aircraft 1. Here, the support structure 14 is a housing or framework (i.e. arrangement of struts) that is independent from the aircraft 1 structure. Alternatively, the payload bay 10 may be integrated with the aircraft 1 such that the aircraft 1 structure itself forms the support structure 14. The side of the support structure 14 having the opening 12 faces the outside of the aircraft 1. This side of the support structure 14 forms part of the aircraft's skin.

The payload bay 10 may comprise a single door 20. In such an example, in the closed configuration, the door 20 covers substantially the whole of the opening 12.

Alternatively, as shown in the Figures, the payload bay 10 may comprise a second door 220 that faces the first door 20 across the payload bay 10. The first door 20 and second door 220 are mirror images of each other. The second door 220 is of the same form and configuration as the first door 20, with the same features. Hence, the doors 20, 200 are both rotary doors. The first door 20 is provided to cover a first region 70 of the opening 12, and the second door 220 is provided to cover a second region 270 of the opening 12. The first region 70 and second region 270 are illustrated in FIG. 3a. In the closed configuration the doors 20, 220 co-operate to cover the whole of the opening 12. While the first region 70 and second region 270 are shown of being approximately equal surface areas, it would be appreciated that in some embodiments one section, and hence one door 20, 220, may be larger than the other.

Each door 20, 220 comprises a panel section 22, 222. The panel section 22, 222 of each door 20, 220 may be planar (that is to say, flat). In the illustrated embodiment, a mounting member 30, 230 (shown in FIGS. 4a to 6c) is coupled to the panel section 22, 220 at right angles to the plane of the panel section 22, 220. The mounting member 30, 230 is for mounting the door 20, 220 to the inside of the support structure 14. The mounting member 30, 230 includes an engagement feature 31, 231. The engagement feature 31, 231 in the illustrated embodiment is an aperture for receiving a fixing member 16, 216 in the form of a protrusion. In alternative embodiments, the engagement feature 31, 231 is a protrusion arranged to be received by a fixing member 16, 216 in the form of an aperture. As illustrated in FIG. 5, the fixing member 16, 216 is arranged to protrude from the inside of a wall (or strut) of the support structure 14 into the cavity 60, such that when engaged with the engagement feature 31, 231 the door 20, 220 is permitted to rotate relative to the wall (or strut) of the support structure 14. The door 20, 220 is operable to rotate about the rotational axis 18, 218 passing through the centre of the respective engagement feature 31, 231 (i.e. the rotation axis of an engagement feature is its central axis, or the axis passing orthogonal to its plane and through the centre).

The panel section 22, 222 has as a fixing edge 50, 250 and a free edge 51, 251. The free edge 51, 251 as illustrated in the Figures is tapered, however in other embodiments the edge may be squared off or rounded. The panel section 22, 222 is arranged in the same plane as the opening 12 when in the closed configuration (FIG. 3b). In other words, the outside surface of the panel section 22, 222 is co-planar with an outside plane of the support structure 14. The free edge 51, 251 is extended out of the plane of the opening into the atmosphere outside the aircraft 1, when the door 20, 220 is in an open configuration (e.g. fully open). When the first door 20 and second door 220 are in the closed configuration, the free edges 51, 251 are disposed opposite and parallel to each other. The fixing edge 50, 250 is disposed on the side of the panel section 22, 222 opposite the respective free edge 51, 251.

In the illustrated embodiments, a reinforcement member 52, 252 is coupled to the fixing edge 50, 250. The reinforcement member 52, 252 tends to provide additional surface area for coupling the mounting member 30, 230 to the door 20, 220, increasing the mechanical strength of the door 20, 220. The mounting member 30, 230 may be coupled to the inside surface of the panel section 22, 222, reinforcement member 52, 252 or both. The panel section 22, 222 and reinforcement member 52, 252 together form approximately an "L" shape (when viewed in longitudinal cross-section). In a preferred embodiment, the intersection of the orthogonal portions of the "L" is curved. The "L" shape tends to provide strength to the door 20, 220.

Further, the reinforcement member 52, 252 may provide coupling means for attaching a payload (item 62 in FIG. 6c) to the door 22, 220. The coupling means in the illustrated embodiment takes the form of a bracket 56, 256 (or pylon). In alternative embodiments, such as illustrated in FIG. 5, the coupling means takes the form of a recess to house a suitable release unit. The coupling means is arranged to face the opening 12 when the door 20, 220 is in the fully open configuration. The reinforcement member 52, 252 may be provided with numerous forms of coupling means in the same embodiment. The coupling means may provide electrical, hydraulic or pneumatic communication to the payload 62 from the aircraft 1. In other words, the door 20, 220 may function as a payload carriage.

In the embodiment illustrated in FIGS. 3a and 3b, the reinforcement member 252 comprises a planar portion 54, 254 and an arcuate portion 53, 253. The arcuate portion 53, 253 is coupled to the fixing edge 50, 250 and curves inwards, towards the centre of the cavity 60 such that the plane of the planar portion 54, 254, coupled to the free edge of the arcuate portion 53, 253 lies at approximate 90 degrees to the plane of the panel section 22, 222. Instead of an arcuate portion 53, 253, the planar portion 54, 254 may be directly coupled to the fixing edge 50, 250. Alternatively to the arcuate portion 53, 253, the planar portion 54, 254 may be coupled to the fixing edge 50, 250 by one or more further planar portions arranged at oblique angles to the planar portion 54, 254 and the panel section 22, 222.

The width of the planar portion 54, 254 is less than the width of the panel section 22, 222. In other words, if the panel section 22, 222 and planar portion 54, 254 were overlaid, the flat portion 54, 254 would be shorter than the panel section 22, 222. This tends to reduce the volume occupied by the door 20, 220 within the cavity 60, enabling smaller payload bays 10 for a given size of payload 62.

The doors 20, 220 are operable to rotate through at least 90 degrees about their rotational axes 18, 218 in order to expose the opening 12 to its greatest extent (shown in FIG. 3a). In the illustrated embodiment, the doors 20, 220 rotate through about 100 degrees about their rotational axes 18, 218. As can be seen, the planar portion 54, 254 of the reinforcement member 52, 252 moves from being parallel to one side of the cavity 60 to move to a position in the fully open configuration in which it is substantially parallel with the ceiling 64 of the cavity 60. This enables a payload 62 coupled thereto to be released into the airflow outside the aircraft 1 without being obstructed by any feature of the door assembly.

While the panel section 22, 222 illustrated in the Figures is longer than it is wide, with its longitudinal axis being parallel with the rotational axis 18, 218 of the door 20, 220, it would be appreciated that in other embodiments the panel section 22, 222 may be relatively short in the direction of the rotational axis 18, 218.

As shown in FIG. 3a, the panel section 22, 222 of an open door 20, 220 only partly extends out of the opening 12, with the remainder of the panel section 22, 222 of the open door 20, 220 being located inside the cavity 60.

Figure 4B:
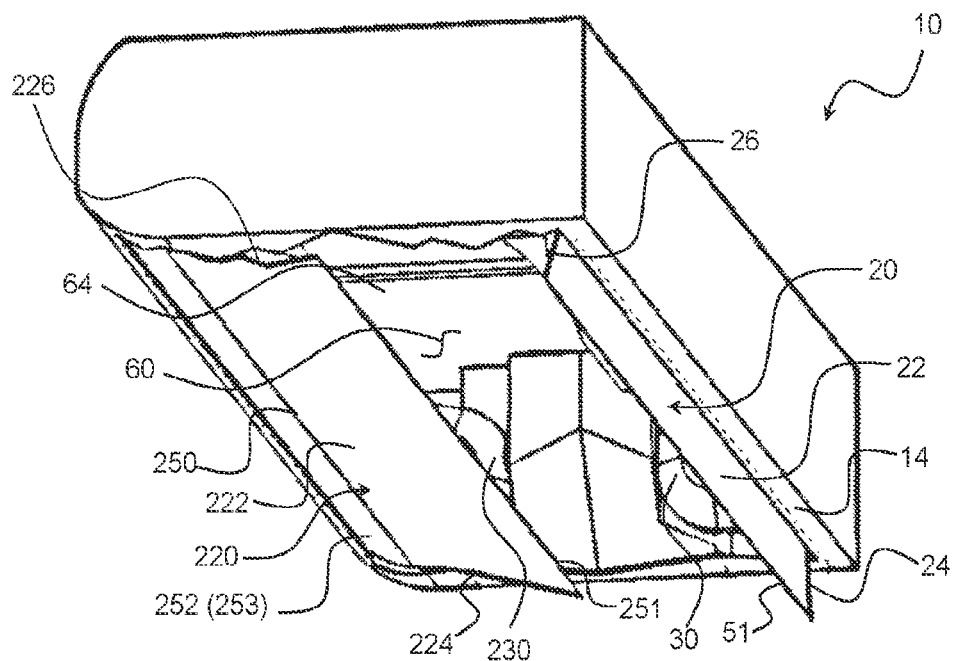
Figure 4C:
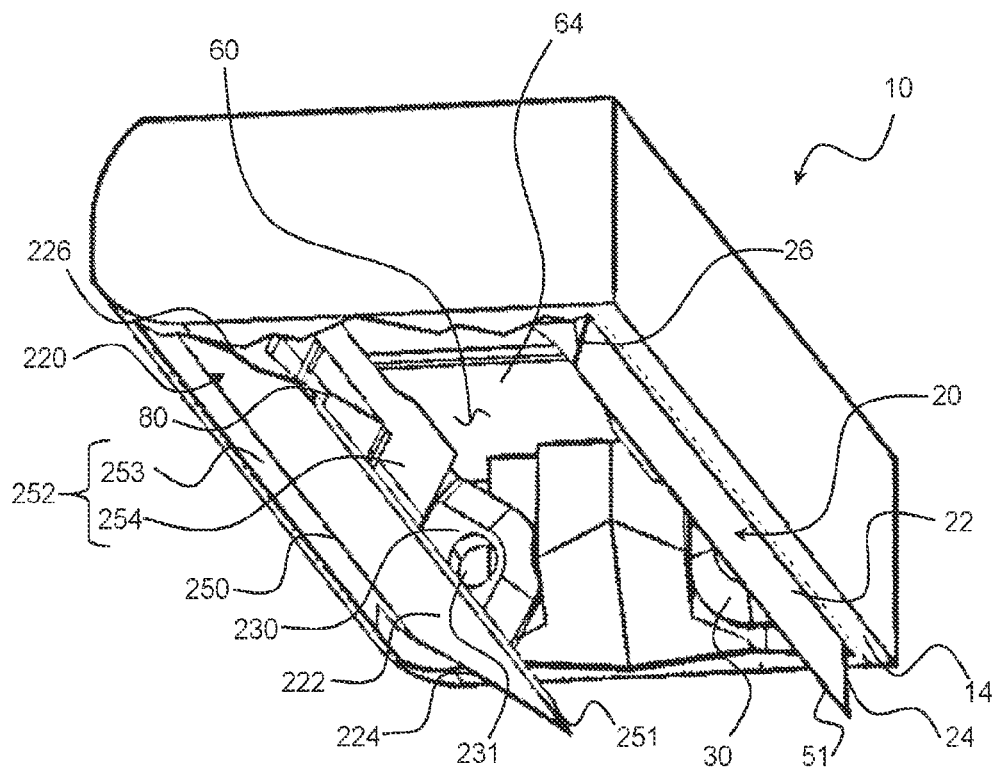
Figure 4D:
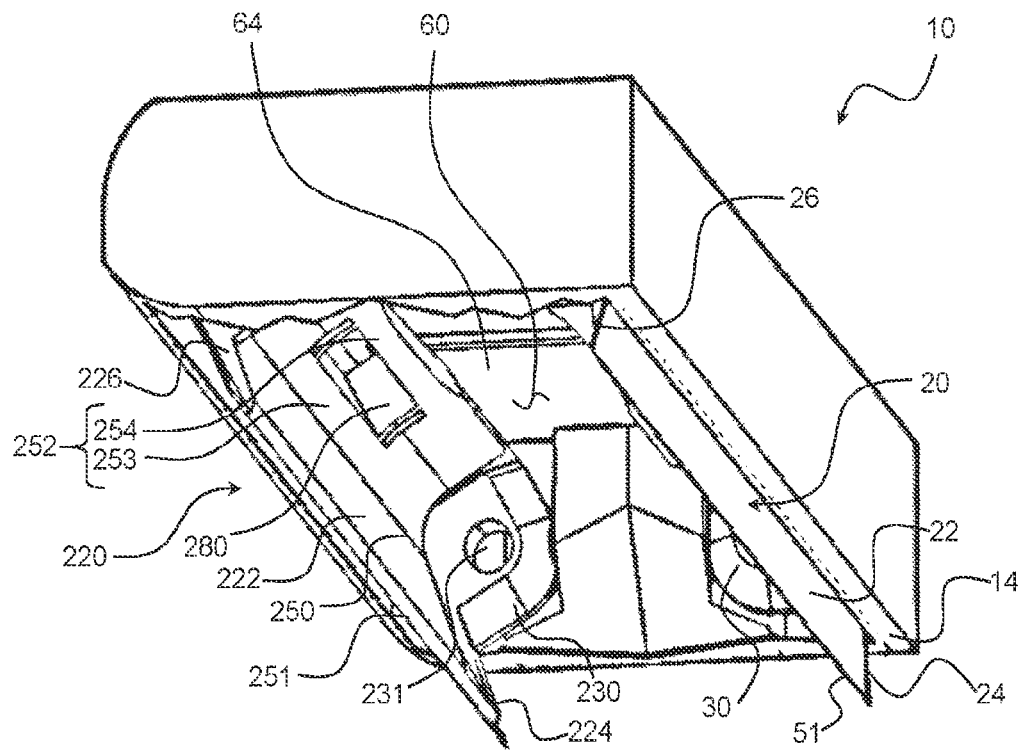
Figure 4E:
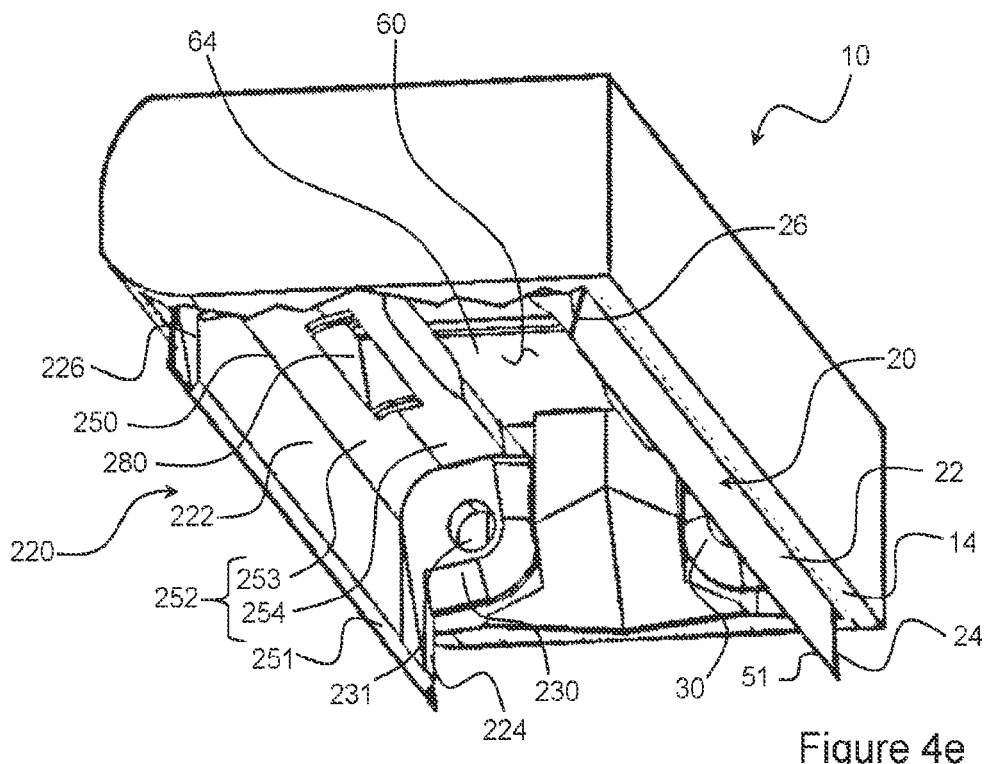

FIGS. 4a to 4e show a payload bay 10 opening sequence, while the payload bay 10 is empty. That is to say, a payload bay 10 is illustrated having first and second doors 20, 220 for covering an opening 12. In FIG. 4a, both doors 20, 220 are closed. FIGS. 4b to 4e show the first door 20 in a fully open configuration while the second door 220 rotates about its rotational axis 218 until in FIG. 4e both doors 20, 220 are in the fully open configuration. The first door 20 rotates anticlockwise about the rotational axis 18 of the engagement feature 31 to move to the fully open configuration, while the second door 220 rotates clockwise about the rotational axis 218 of the respective engagement feature 231 to move to the fully open configuration. It would be understood that it is not necessary to open both doors 20, 220 simultaneously, and in fact only one of the doors 20, 220 may open depending on the access to, or egress from, the cavity 60 that is required (as illustrated in FIG. 4b, for example).

In the illustrated embodiment, a recess 80 is used as a coupling means for coupling a payload 62 to the reinforcement member 252. The coupling means is disposed partway along the length of the reinforcement member 252.

The panel section 22, 222 extends along the length L of the opening 12. The panel section has a first end 24, 224 and a second end 26, 226 disposed opposite each other. As illustrated in FIG. 5, the fixing edge 50, 250 extends along the length L of the panel section 22, 222 from the first end 24, 224 to the second end 26, 226. The reinforcement member 52, 252 also extends along the full length L of the panel section 22, 222. However, in other embodiments, the reinforcement member 52, 252 may be bifurcated or extend only partway along the length L of the panel section 22, 222.

The panel section 22 of the first door 20 is offset from its rotational axis 18 along its length L, and extends in the same direction as the first rotational axis 18 along its length between the ends 24, 26. Likewise, the panel section 222 of the second door 220 is offset from its rotational axis 218 along its length L, and extends in the same direction as the rotational axis 218 along its length between the ends 224, 226. That is to say, the panel section 22, 222 of each door 20, 220 does not intersect with its respective rotational axis 18, 218 at any point along its length L.

In some examples, for example where the panel sections 22, 222 are planar, the panel section 22, 222 is offset from (i.e. spaced apart from), and parallel with, its respective rotational axis 18, 218 along the length L of the panel section 22, 222. In some examples, for example where the inner and/or outer surface of the panel sections 22, 222 are planar, the respective surface of the panel section 22, 222 is offset from (i.e. spaced apart from), and parallel with, its respective rotational axis 18, 218 along the length L of the panel section 22, 222.

In embodiment illustrated in FIG. 5, the mounting member 30, 230 and the fixing member 16, 216 are coupled such that the door 20, 220 is rotatable with, and driveable by, the fixing member 16, 216 about the rotational axis 18, 218 to rotate the panel section 22, 222 about the rotational axis 18, 218. Hence, the respective fixing members 16, 216 are spaced apart from one another across the width of the payload bay 10. The fixing member 16, 216, therefore, is coupled to an actuator 32, 232 (i.e. a motor). In other words, the fixing member 16, 216 is a drivable shaft. The first door 20 and second door 220 are controllable to open and close individually as each fixing member 16, 216 is coupled to an independent actuator 32, 232. The actuators 32, 232 may be controllable by a pilot-operable switch in the cockpit or a ground station where the aircraft 1 is an unmanned aerial vehicle.

The actuators 32, 232 are shown disposed outside the support structure 14, with the fixing members 16, 216 passing through the walls (or struts) of the support structure 14 to enable the doors 20, 220 to rotate relative to the support structure 14. The actuators 32, 232 therefore may be disposed in the body of the aircraft 1. Alternatively, the payload bay 10 may comprise another housing (not shown) encompassing both the support structure 14 and the actuators 32, 232. In other embodiments, the actuators 32, 232 are coupled to the inside of a wall (or strut) of the support structure 14, within the cavity 60.

Instead of each door 20, 220 having independent actuators 32, 232 that enable each door 20, 220 to be opened and closed independently at different speeds, each of the fixing members 16, 216 may be coupled, for example by some gearing means, to the same actuator 32, 232 such that the doors 20, 220 open and close at the same time and speed.

It would be appreciated by the skilled person that other means for controlling the doors 20, 200 to open and close by rotating about their rotational axes 18, 218 are available in the art, instead of being driven by the fixing members 16, 216. While in the embodiment of FIG. 5 the fixing member 16, 216 and mounting member 30, 230 are shown as mutually rotatable, in other embodiments the fixing member 16, 216 may remain fixed while the mounting member 30, 230 rotates about it. For example, electromagnets affixed to the support structure 14 may be used to retain the doors 20, 220 in the closed configuration (where ends 24, 224, 26, 226 of the panel section 22, 222 comprise magnetic material or further electromagnets), and the electromagnets may be switched off in order to release the respective doors 20, 220. The electromagnets may then be reactivated to draw the respective doors 20, 220 back into the closed configuration.

In another embodiment, a tensile member (e.g. a rope, chain or lanyard) coupled to the outside edge (i.e. towards or at the free edge 51, 251) of the panel section 22, 222 may be driven to pull the respective door 20, 220 towards the ceiling 64 of the cavity 60 to close the door 20, 220. The tensile member may be driven by an actuator (e.g. a winch) within the cavity 60 or disposed outside the upper surface of the support structure 14. For example, the actuator may be disposed on the ceiling 64 of the cavity 60. The tensile member may therefore be released to allow the respective door 20, 220 to open.

Instead of being driveable, the fixing members 16, 216 may be apertures or spigots about which the doors 20, 220 are driven to rotate. In other words, one important aspect of the present disclosure lies in the relative positioning of the panel sections 22, 222 and their rotational axes 18, 218, rather than how they are driven to rotate about those rotational axes 18, 218.

While the actuators 32, 232 are shown as being direct drive rotary motors, they may instead be arranged to drive respective doors 20, 220 about their rotational axes 18, 218 by a mechanism of gears and/or journals. In other words, the actuators/motors 32, 232 may not be co-axial with the rotational axes 18, 218 of the respective doors 20, 220. The fixing members 16, 216 here, instead of being longitudinal shafts, may be geared wheels.

In the illustrated embodiment, the mounting member 30, 230 has an engagement feature 31, 231 which engages with a compatible engagement feature on the fixing member 16, 216. For example, the engagement feature 31, 231 may be an aperture into which the fixing member 16, 216 in the form of a shaft is located and engaged, for example by some mechanical means such as a friction mounting, splined arrangement, or interlocking arrangement. Therefore, the mounting member 30, 230 and fixing member 16, 216 are engaged such that they are rotatable together around the rotational axis 18, 218. In other words, in the illustrated embodiments, the engagement feature 31, 231 is a journal for receiving the fixing member 16, 216, which is in the form of a rotatable shaft (or spigot). However, in other embodiments, the fixing member 16, 216 may be in the form of an aperture or recess in a wall (or strut) of the support structure 14. Here, the engagement feature 31, 231 is in the form of a shaft/spigot for passing through the aperture and engaging with an actuator 32, 232.

As best shown in FIG. 5, each panel section 22, 222 comprises a second mounting member 130, 330 spaced apart from and opposite the respective mounting member 30, 230 along the length L of the panel section 22, 222. The second mounting member 130, 330 comprises a second engagement feature 131, 331 configured to engage with a second fixing member 116, 316. The second engagement feature 131, 331 is disposed co-axially with the respective engagement feature 31, 231. In some embodiments, the second fixing member 116, 316 is coupled to the support structure 14. In the illustrated embodiment, the second fixing member 116, 316 is a rotatable drive coupled to a second actuator 132, 332. The second fixing member 131, 331 and respective second mounting member 130, 330 are configured to permit the respective doors 20, 220 to rotate about their respective rotational axes 18, 218. The second mounting member 130, 330 and the second fixing member 116, 316 are coupled such that the door 20, 220 is rotatable with, and driveable by, the second fixing member 116, 316 about the rotational axis 18, 218 to rotate the panel section 22, 222 about the rotational axis 18, 218.

The second engagement feature 131, 331 may be an aperture, or other suitable mechanical means configured to engage with a compatible second fixing member 116, 316. The second fixing member 116, 316 may be provided as a spigot, which the second mounting member 130, 230 is free to rotate around and/or relative to. In other words, the second fixing member 116, 316 may not be rotatable, or may not be actuated.

In other words, the second mounting member 130, 330, second engagement feature 131, 331, second fixing member 116, 316 and second actuator 132, 332 may take the same form as, respectively, the mounting member 30, 230, engagement feature 31, 231, fixing member 16, 216 and actuator 32, 232, but disposed opposite thereto. The second actuator 130, 330 may be driven at the same time and speed as the respective actuator 30, 230 in order to enable smooth opening of the door and reduce stress on one end 24, 26, 224, 226. Alternatively, the actuator 32, 232 may be configured to rotate the door 20, 220 in the opposite direction to the respective second actuator 132, 332. For example, the actuator 32, 232 may be activated to open the door 20, 220 while the second actuator 132, 332 may be activated to the close the same door 20, 220. Here, when one of the actuator 32, 232 and second actuator 132, 332 is activated, the opposing actuator 32, 232 or second actuator 132, 332 is allowed to freely rotate.

Each door 20, 220 may be divided along its length L, perpendicularly to the rotational axes 18, 218, into two parts, such that each part is independently configurable to be in an open configuration or the closed configuration by way of actuation of a respective actuator 32, 132, 232, 332 coupled to that part. In other words, the panel section 22, 232 and (where present) the reinforcement member 52, 252 may be bifurcated. This enables part of the cavity 60 to be accessible without having to reveal the entire contents of the cavity 60 or expose parts of the panels 22, 222 unnecessarily to the airflow. Two parts of one door 20, 220 may be opened simultaneously to fully reveal the associated region 70, 270 of the opening 12.

The, or each, mounting member 30, 130 is located inside the cavity 60, and the rotational axis, or rotational axes, 18, 218 are offset from the opening 12 along their respective lengths. Hence, the fixing members 16, 116, 216, 316 provided on or through the support structure 14 are located inside the cavity 60, offset from the opening 12. That is to say, the engagement features 31, 131, 231, 331 and the mounting members 30, 130, 230, 330 to which they relate, are spaced apart from the opening 12 on the inside of the cavity 60.

The shortest distance of the rotational axes 18, 118 to the opening 12 may be at least 15% but no more than 50% of the panel section 22, 222 width. The shortest distance of the rotational axes 18, 118 to the opening 12 may be dependent on at least aircraft 1 structural form, applied loads, door stiffness required, speed of operation, and/or internal load packaging.

As illustrated in FIGS. 6a-c, the support structure 14 (i.e. housing) may be used to house payloads 62 (i.e. equipment) of various kinds, for example sensors (e.g. optical camera), landing gear, ordnance, cargo, drones, antennas, cameras and/or fuel tanks. In the Figures, the payloads 62a-f (generally 62) are shown as missiles. Each of the payloads 62 may be different to one another.

As shown by comparison of FIGS. 6a and 6b, one or both of the doors 20, 220 may be provided with a payload 62, which rotates with the door 20, 220. For example, payload 62a, 62b, may be attached to the inside surface of the planar portion 54, 254 or the inside of the panel section 22, 222 such that when the door 20, 220 is open, the payload is in a position ready to be operated or accessed. As best shown in FIGS. 4b-e, the planar portion 54, 254 of the reinforcement member 52, 252 may comprise recesses 80 (i.e. pockets) for coupling of payloads 62.

The ceiling 64 of the cavity 60 (i.e. the inside top surface of the support structure 14, facing the opening 12) is provided with at least one pylon 356 for receiving a payload 62c-f. In other words, the support structure 14 and the doors 20, 220 may be configured to carry payloads 62. In some embodiments, only the doors 20, 220 are arranged to carry payloads 62 to minimise the required width of the panel section 22, 222.

Hence, there may be provided a door assembly (providing at least one door 20, 220), a payload bay 10 comprising the door assembly of the present disclosure rotatably coupled thereto, and/or an aircraft 1 comprising a payload bay 10 of the present disclosure. The door assembly may be provided with actuation means. The door assembly tends to provide a more space-efficient door assembly compared to examples of the related art. It also tends to provide a means of mounting an automated door 20, 220 with a more robust mounting mechanism than that provided by the related art.

The door 20, 220 design of the present disclosure tends to maximise use of the cavity 60 volume. This is because the doors 20, 220 of the present disclosure are provided to the sides of the support structure 14 and provide a small obstruction when open, rather than in examples of the related art where door-actuating mechanisms and hinges may partly obstruct the opening when the doors are open. Also, since, when open, the panel sections 22, 222 of the doors 20, 220 of the present disclosure do not extend as far out of the bay as examples of the related art, there is less wind resistance (i.e. less drag) when open in flight, and the ground clearance of the aircraft 1 is increased which makes maintenance of the aircraft 1 easier for ground crew.

Hence, for a given opening 12 perimeter (i.e. size), the size of the door 20, 220 surface area exposed to aerodynamic forces tends to be significantly reduced compared with traditional designs, which tends to result in improved aircraft 1 aerodynamic properties when the payload bay 10 is open, primarily in the form of lower drag. In other words, less kinetic energy is lost during times when the bay doors 20, 220 are open, and lower impact on host aircraft 1 stability and control. Smaller exposed door area, and hence lower aerodynamic loading, may also mean smaller or less powerful actuators 32, 132, 232, 332 are required to open the door 20, 220.

Figure 1:
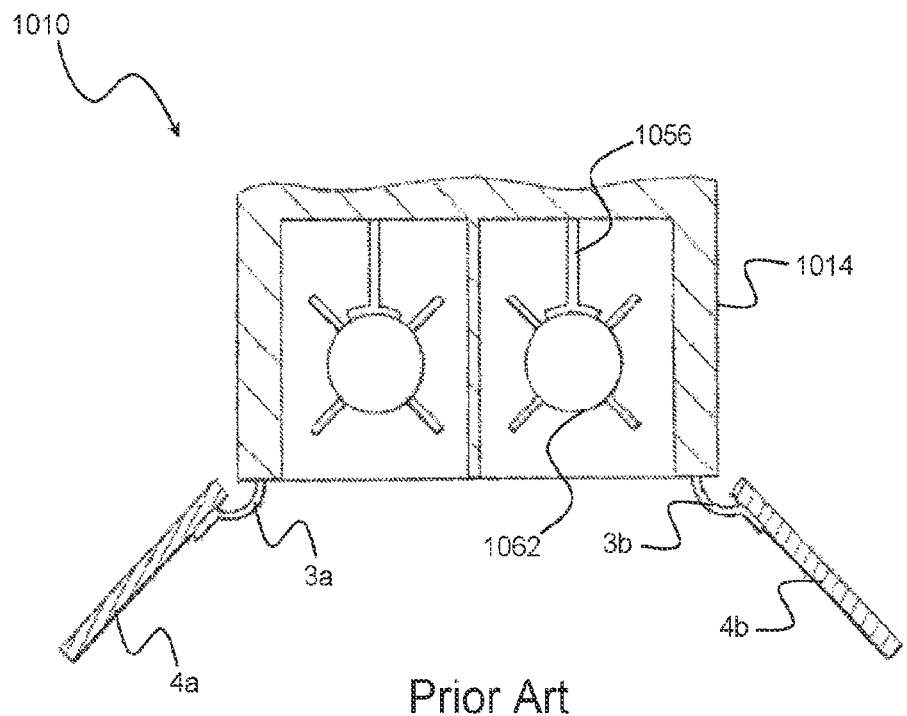
FIG. 1 shows a payload bay having a door assembly according to the prior art.

The doors 20, 220 of the present disclosure may rotate through 90 degrees or more to expose the opening 12 without the need of extended hinges 3a, 3b (for example as shown in the prior art of FIG. 1). This provides a simpler actuation solution compared to examples of the related art.

Additionally, the actuation mechanism infrastructure of the present disclosure compared to traditional designs tends to be reduced. With a traditional payload bay design, an actuator would be connected to a gearbox to drive a shaft or torque tube from which powered hinges extract motive force to drive doors through a set angle. The door assembly concept of the present disclosure replaces much of this with fixing members 16, 216, 116, 316 which form part of, or are coupled to, the door panel sections 22, 222. Hence the doors 20, 220 of the present disclosure are driven from one or both ends by an actuator 16, 216, 116, 316, thereby simplifying the actuation mechanism design which in turn may improve reliability (for example, because fewer parts are required) and also mechanical accuracy (because fewer parts are used, and hence there are fewer parts with a tolerance to stack up) which could simplify door assembly and control.

As discussed, in some examples a single door 20 may be provided to cover the opening 12 of the payload bay 10 (i.e. the entrance to the cavity 60 within the payload bay 10). However, for a given opening 12 size, the provision of two doors 20, 220, as shown in FIGS. 3a to 6c, which rotate in opposite directions, means that the overall payload bay 10 height/depth may be less, tending to allow for greater packaging efficiency. Packaging efficiency may be defined as number of stores (i.e. payloads 62) per unit cross sectional area or per unit volume. Arranging doors 20, 220 to rotate in this way allows them to mostly retract internally, resulting in the benefits described above. Embodiments with a single door 20 may relate to payload bays 10 for carrying a single missile or landing gear unit, for example. Such a payload bay 10 may be found on the shoulder of the aircraft's fuselage.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A door assembly for a payload bay (10) having an opening (12), the door assembly comprising at least one door (20, 220), the at least one door comprising:
    a panel section (22, 222) having a first end (24, 224) and a second end (26, 226); and
    a first mounting member (30, 230) arranged orthogonally to the panel section at the first end and having a first engagement feature (31, 231) having a rotational axis (18, 218) about which the panel section is arranged to rotate, the first engagement feature being arranged to engage with a first fixing member (16, 216) on one side of the payload bay to rotatably couple the panel section to the payload bay,
    wherein the at least one door is arranged to rotate between a closed configuration, in which the panel section is arranged in a same plane as the opening of the payload bay, and an open configuration, in which the panel section is arranged at at least 90 degrees to the plane of the opening, by rotating about the rotational axis,
    wherein the panel section is arranged parallel to and offset from the rotational axis, such that an inner surface of the panel section faces the rotational axis,
    wherein the panel section comprises a free edge (51, 251) extending between the first end and the second end of the panel section, and a fixing edge (50, 250) parallel to and opposite the free edge, the fixing edge being located in the payload bay in the open configuration,
    wherein the at least one door further comprises a reinforcement member (52, 252) extending from the fixing edge and wherein the reinforcement member comprises a mounting means (56, 256, 80, 280) for coupling a payload to the at least one door.

2. The door assembly according to claim 1, further comprising a second mounting member (130, 330) disposed opposite the first mounting member, the second mounting member comprising a second engagement feature (131, 331) arranged co-axially with the rotational axis,
    wherein the second mounting member is arranged to engage with a second fixing member (116, 316) on an opposite side of the payload bay, and
    wherein the first engagement feature and the second engagement feature are arranged to permit the panel section to rotate about the rotational axis.

3. The door assembly according to claim 1, wherein an extent of the reinforcement member in a horizontal plane is less than an extent of the panel section in a vertical plane when the at least one door is in the open configuration.

4. The door assembly according to claim 1, wherein the reinforcement member further comprises a planar portion (54, 254) arranged at about 90 degrees to the panel section.

5. The door assembly according to claim 1, wherein the reinforcement member further comprises an arcuate portion (53, 253) having one edge coupled to the fixing edge.

6. The door assembly according to claim 1, wherein the first mounting member is coupled to the panel section and/or the reinforcement member.

7. The door assembly according to claim 2, further comprising a first actuator (32, 232) for driving the first fixing member to rotate the first mounting member, such that the panel section is rotatable with, and driveable by, the first fixing member about the rotational axis.

8. The door assembly according to claim 7, further comprising a second actuator for driving the second fixing member to rotate the second mounting member, such that the panel section is rotatable with, and driveable by, the second fixing member about the rotational axis.

9. The door assembly according to claim 1, wherein the at least one door comprises a first door (20) and a second door (220), arranged such that, when both the first door and the second door are in the closed configuration:
  the free edges of each panel section face each other; and
  the first door and the second door substantially cover the opening.

10. A payload bay (10) comprising a support structure (14) and a door assembly according to any one of the preceding claims, wherein the support structure defines the opening (12) providing access to/from a cavity (60) within the payload bay, wherein the first mounting member and the second mounting member (30, 130, 230, 330) of the at least one door (20, 220) is located inside the cavity such that the rotational axis (18, 218) is offset from the plane of the opening.

11. The payload bay according to claim 10, wherein, in the open configuration, the panel section of the at least one door only partly extends out of the cavity, a remainder of the at least one door being located in the cavity.

12. An aircraft (1) comprising a payload bay (10) according to claim 10, the payload bay being arranged such that an outer surface of the panel section (22, 222) forms part of an outer surface of the aircraft when the at least one door is in the closed configuration.

13. The door assembly according to claim 2, wherein the first engagement feature comprises an aperture for receiving the first fixing member.

14. The door assembly according to claim 1, wherein the first engagement feature comprises an aperture for receiving the first fixing member.

15. A door assembly for a payload bay (10) having an opening (12), the door assembly comprising at least one door (20, 220), the at least one door comprising:
  a panel section (22, 222) having a first end (24, 224) and a second end (26, 226); and
  a first mounting member (30, 230) arranged orthogonally to the panel section at the first end and having a first engagement feature (31, 231) having a rotational axis (18, 218) about which the panel section is arranged to rotate, the first engagement feature being arranged to engage with a first fixing member (16, 216) on one side of the payload bay to rotatably couple the panel section to the payload bay,
  wherein the at least one door is arranged to rotate between a closed configuration, in which the panel section is arranged in a same plane as the opening of the payload bay, and an open configuration, in which the panel section is arranged at at least 90 degrees to the plane of the opening, by rotating about the rotational axis,
  wherein the panel section is arranged parallel to and offset from the rotational axis, such that an inner surface of the panel section faces the rotational axis while rotating between the closed configuration and the open configuration and while rotating between the open configuration and the closed configuration,
  wherein the panel section comprises a free edge (51, 251) extending between the first end and the second end of the panel section, and a fixing edge (50, 250) parallel to and opposite the free edge, the fixing edge being located in the payload bay in the open configuration,
  wherein the at least one door further comprises a reinforcement member (52, 252) extending from the fixing edge and wherein the reinforcement member comprises a mounting means (56, 256, 80, 280) for coupling a payload to the at least one door.

* * * * *